Figure 1:
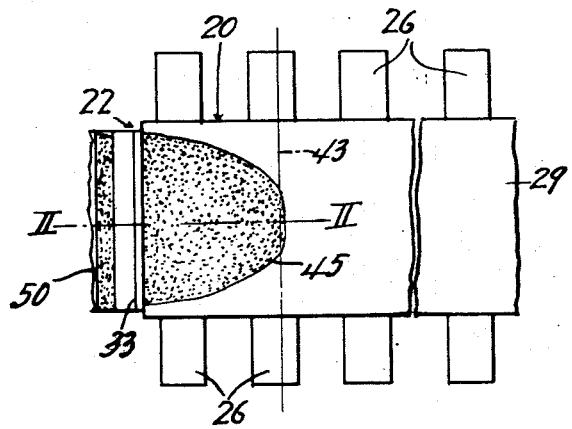

May 26, 1942.   H. L. HALBACH ET AL   2,284,420

METHOD OF FEEDING GLASS MAKING BATCHES

Filed April 11, 1940    3 Sheets-Sheet 1

INVENTORS
HOWARD L. HALBACH
WALTER G. KOUPAL and
WILLIAM OWEN
BY Olew E. Bee
ATTORNEY.

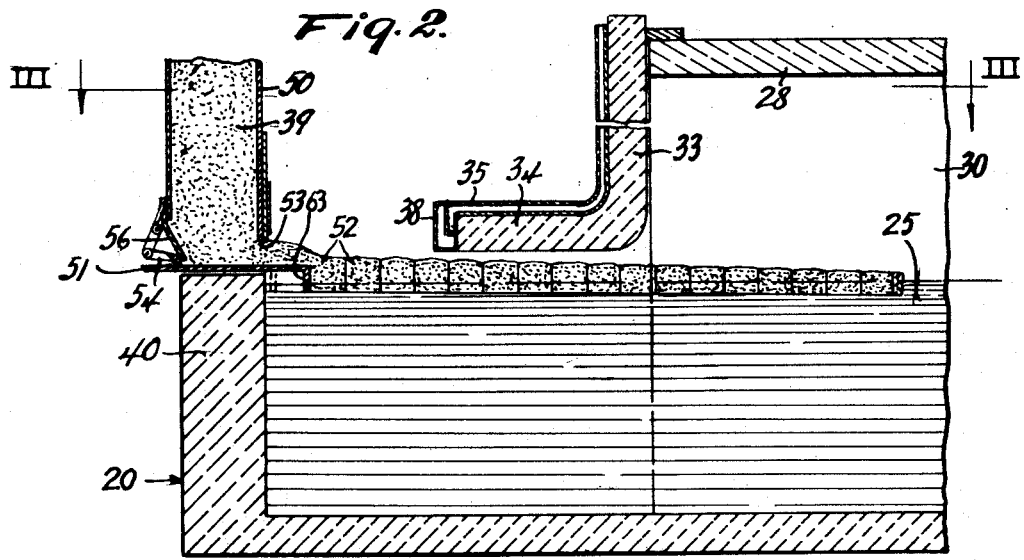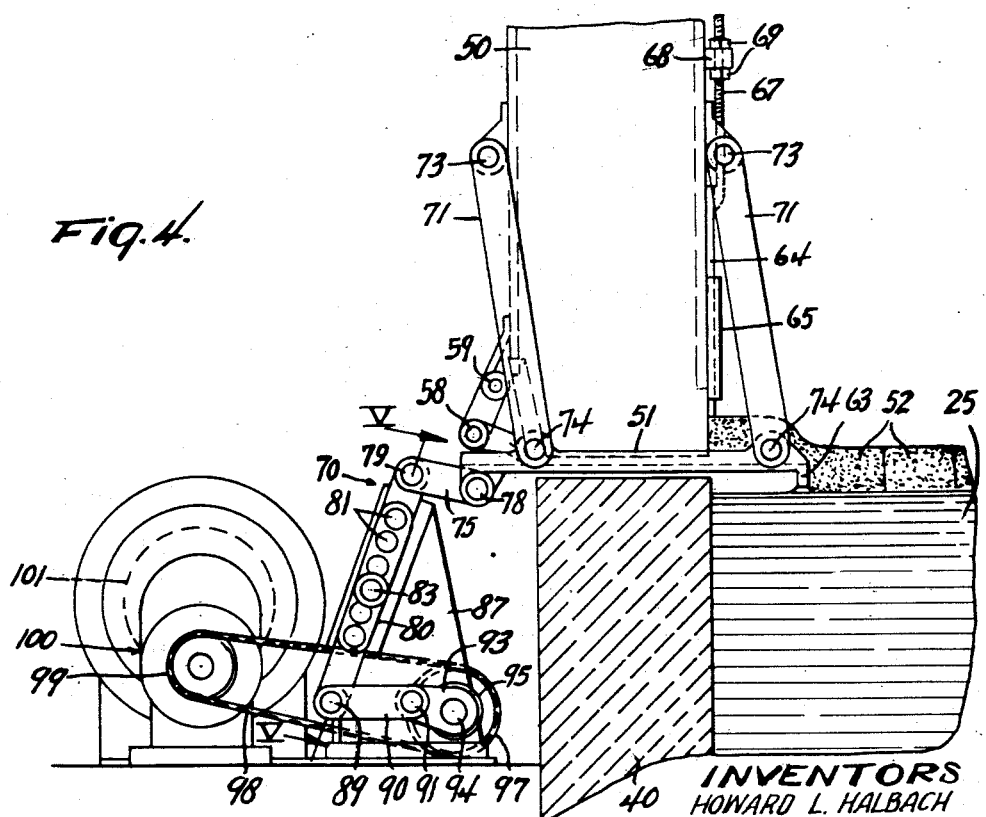

May 26, 1942.  H. L. HALBACH ET AL  2,284,420
METHOD OF FEEDING GLASS MAKING BATCHES
Filed April 11, 1940   3 Sheets-Sheet 3
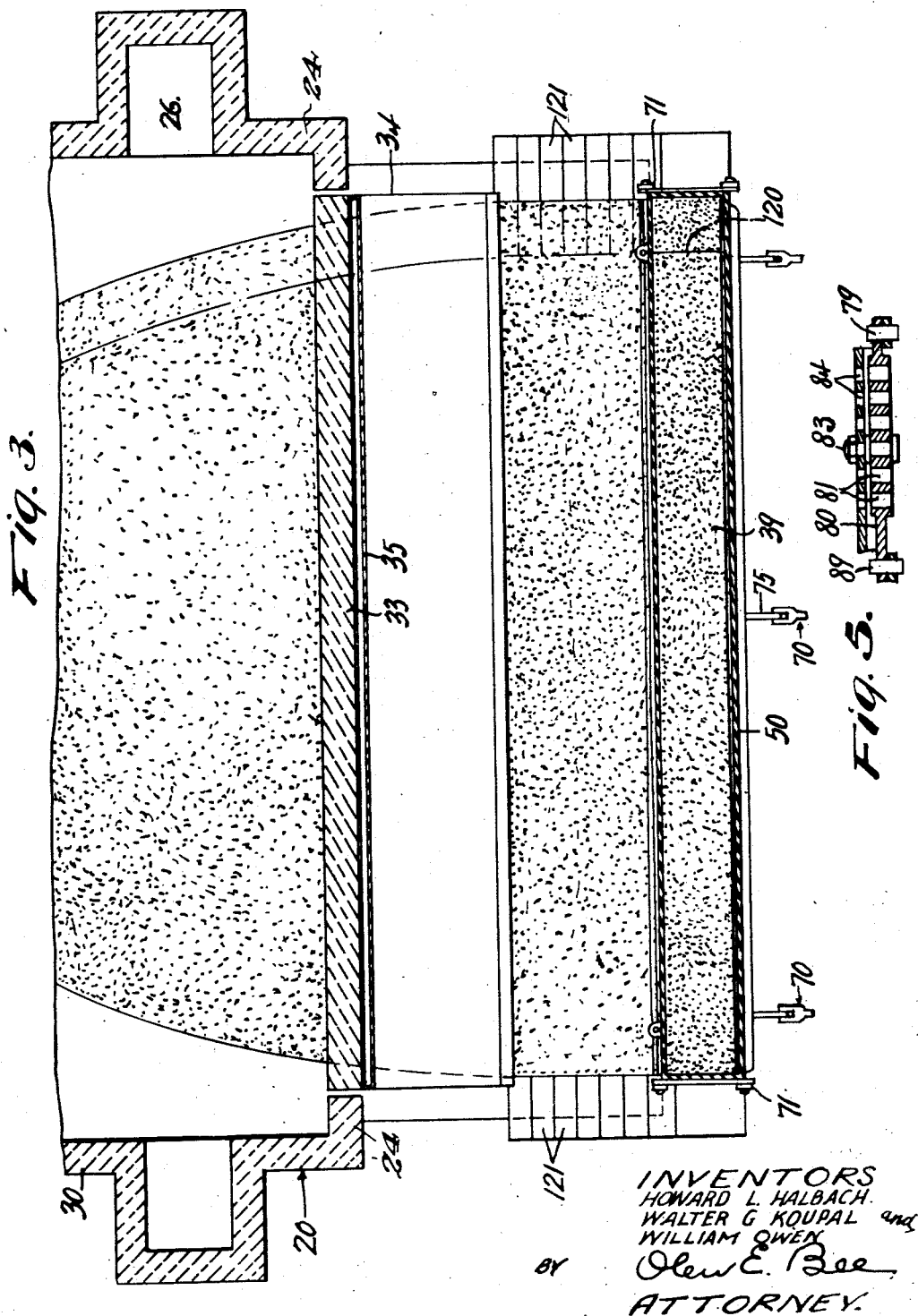

UNITED STATES PATENT OFFICE 2,284,420

METHOD OF FEEDING GLASS MAKING BATCHES

Howard L. Halbach and Walter G. Koupal, Clarksburg, W. Va., and William Owen, Pittsburgh, Pa., assignors to Pittsburgh Plate Glass Company, a corporation of Pennsylvania Application April 11, 1940, Serial No. 329,096

16 Claims. (Cl. 49—77)

This invention relates to a method of feeding granular material and it has particular relation to the incorporation of a uniform blanket of such material in a molten glass bath.

The invention described and claimed herein is related to the invention disclosed in our application, Serial No. 318,878, filed February 14, 1940.

One object of the invention is to provide an improved method of incorporating glass-making batch in a molten glass bath of a melting tank in such manner as to insure on the bath the formation of a uniform blanket of batch material subject to uniform melting.

Another object of the invention is to provide an improved method of charging glass-making material into a melting tank in such manner as to provide for exposing substantially maximum area of the material to a melting heat in the tank.

Another object of the invention is to provide a method of uniformly and progressively charging glass batch material into a melting tank in such manner as to insure melting of the material at lower temperatures than those required for melting like material fed by conventional methods.

Another object of the invention is to provide an improved method of successively feeding layers of glass batch material into a melting tank to form a blanket of substantially uniform thickness on a molten glass bath and progressively moving the material into tank until it is melted.

Another object of the invention is to provide an improved method of incorporating glass-making batch in a molten glass bath in such manner as to maintain sufficient body in the batch to insure its floating uniformly on the bath until it is melted and to prevent batch particles from being blown in dust or like form from the batch.

Another object of the invention is to provide an improved method of feeding granular batch material upon a molten bath into which the batch is to be incorporated.

In the conventional and customary practice of feeding batch material into a glass melting tank or furnace, certain disadvantages were present by virtue of the difficulty experienced in securing uniform melting of the material and also in securing maximum efficiency of the heating mediums employed to reduce the material to molten state. It has been customary to employ flames from fuel, such as gas, projected laterally from opposite sides of the furnace through ports formed therein.

Various types of feeding devices for granular material have been proposed, such as the type in which there was provided a relatively narrow enclosure, or so-called "dog house" at the entrance or charging end of the tank for receiving bulky piles of batch which were then pushed through a suitable opening or gate into the body of the tank. Unwieldy mounds of batch were in this manner distributed or localized adjacent the entrance end of the tank and they floated and melted unevenly toward the discharge end of the tank. Other types dumped quantities of batch material adjacent the entrance end of the tank, and the material, as it was melted, flowed toward the exit, or glass drawing end of the tank. Such feeding involved periodical exposure of the bath to outside atmosphere by opening doors through which the material was supplied and also involved agitating the body of the bath, as well as the raising of dust inside and outside the tank.

Although the gas flames for melting the material appeared to envelope practically all of the exposed area of this heaped and unevenly distributed material, it has been observed that considerable amount of the heat required to melt the batch was taken by conduction from the molten bath itself through the portion of the material below the bath surface. This condition was caused in view of the fact that in the previously-known methods, a major proportion of the material of the localized piles of the batch sank below the surface of the molten bath, and the flames could not play efficiently upon such partially submerged bulky piles of batch material.

According to this invention, the glass-making material is fed uniformly to provide a relatively thin layer or blanket of material beginning at the entrance end of the furnace while maintaining such blanket progressively in substantially the thin blanket form as it is moved farther into the tank and progressively melted. After the material, in its relatively thin layer form, has been fed into the tank, the fuel flames and the heat radiated from surrounding heated refractories cause a fritting or sintering of the upper layer surface, and this action insures a coherent relation among the particles of the upper sides of the batch layer. Whatever batch or atmospheric agitation or turbulence that may result from progressively incorporating the batch material in the molten bath, or from the force of the fuel jets projected into the tank, does not disturb the uniformity of the blanket or raise any dust in the tank atmosphere.

Cullet can be added to the batch in desired proportions, and ordinarily the batch is prepared to contain approximately four to six per cent, by weight, of moisture to insure a tendency of the batch particles to cohere. This kind of uniform blanket is susceptible to melting much more uniformly and efficiently than the batch fed by known methods because the gas flames can then be directed into contact with a greater portion of the thin blanket on the exposed surface thereof.

In conventional practice, the temperature required for proper melting of the batch is of such intensity that the refractories of which the tank walls are constructed are taxed almost to their limit. However, by employing the improved method of providing a thin blanket of material over the surface of the bath, the melting can be accomplished at materially reduced temperatures. That is, instead of employing temperatures almost equal to the critical resistance of the refractories, more favorable tolerances in safety factors of the refractories are available. Hence, the life of the refractories is greatly prolonged without adversely affecting the molten condition of the glass bath. Material saving in both the refractory walls of the tank and the gas fuel can thus be effected. Reduction of temperatures in the values of approximately 75° to 125° F., as compared with conventional operation of glass melting tanks, result from the practice of the improved method.

Figure 6:
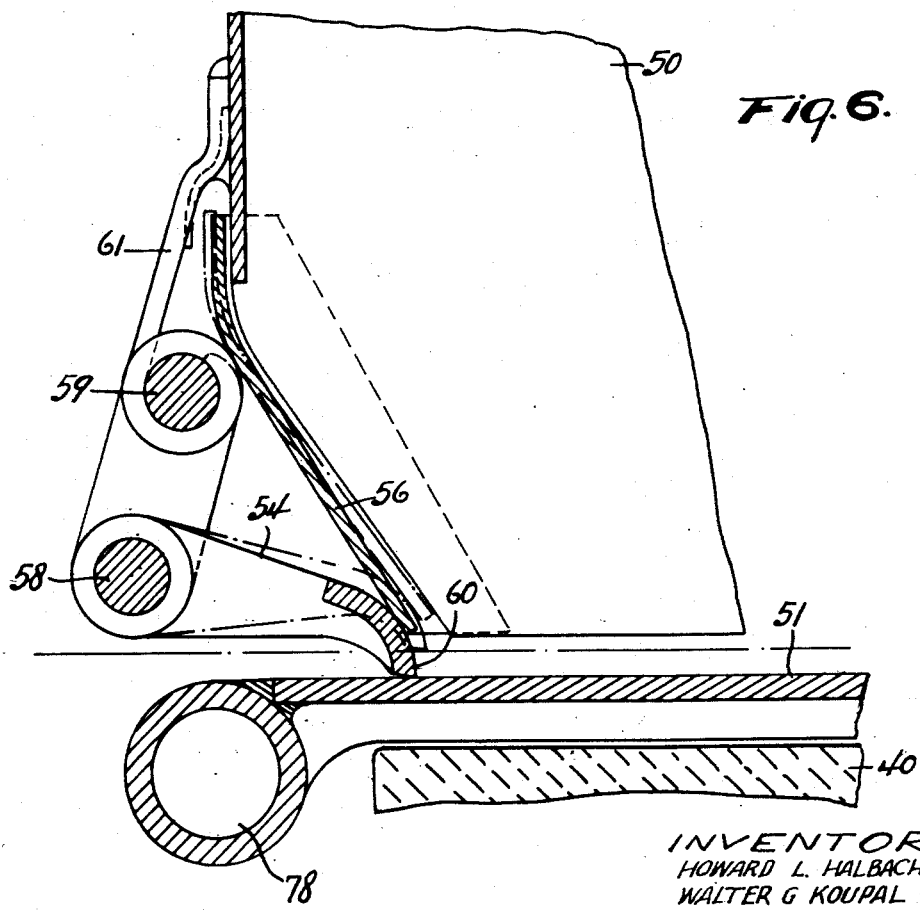

In the drawings:

Fig. 1 is a diagrammatic fragmentary plan of a glass melting tank; Fig. 2 is a vertical section taken substantially along the line II—II of Fig. 1; Fig. 3 is a fragmentary horizontal section taken substantially along the line III—III of Fig. 2; Fig. 4 is a fragmentary vertical section, on a larger scale, showing in detail parts of a batch feeding mechanism; Fig. 5 is a fragmentary vertical section taken substantially along the line V—V of Fig. 4; Fig. 6 is a fragmentary vertical section, on a larger scale, of a sealing structure for the rear wall of a hopper.

In practicing the invention, a glass melting tank or furnace 20 is provided with an entrance extremity 22 which is almost as wide as the body of the tank, and the lines of division defining the junction between the entrance extremity 20 and the body of the tank are included in the offset and shouldered portions 24 of the tank structure. During its operation, the tank contains a bath of molten glass 25 which is maintained in molten state by means of flames from suitable fuel fed through ports 26 in the tank walls 27. The tank includes a roof 28, supported upon tank walls 30, according to well-known methods of construction. In one form of apparatus known as a regenerative type of tank, the flames are played over the surface of the bath alternately at proper intervals from opposite sides of the tank. Ordinarily tanks of this general type are operated continuously and the molten bath moves toward the exit extremity 29 from which glass can be drawn in sheet form.

A rear vertical wall 33 is erected across the entrance end of the tank and is provided with a lower horizontal section 34 which has its lower surface so positioned as to be spaced in parallel relation only a short distance from the upper surface of the molten bath. Suitable coolers 35 and 38 are disposed along the outer vertical side of the wall and along its horizontal section. The particular construction of this sectional vertical wall does not constitute per se a part of the invention claimed herein. The outside or rear edge of the horizontal section 34 supporting the cooler 38 is located materially inwardly or forwardly of the plane of the rear bath retaining wall 40 of the tank.

Batch material 39 containing ingredients suitable for making glass are fed uniformly upon the surface of the molten bath adjacent the rear end wall 40, and the blanket so formed on the surface of the bath moves underneath the horizontal wall section 34 in close proximity thereto into the main body of the tank. Flames playing over the upper surface of the uniformly spread material causes it to melt gradually as the glass bath moves away from the entrance extremity and the replenishing or incoming material is entirely melted approximately by the time it reaches the location indicated by the transverse broken line 43 in Fig. 1; that is, along the area known as the foam line. In response to heat applied in the tank, the glass bath reaches substantially its maximum temperature in the vicinity of this foam line and this maximum temperature is maintained over a limited area as the bath moves forwardly and is gradually cooled sufficiently to conform to the temperature required in drawing sheet glass at the exit or drawing end of the tank. The unmolten or partially melted blanket of material assumes the shape indicated at 45 of this figure, wherein it will be apparent that the width and thickness of the blanket of material diminishes gradually as it passes farther into the tank until the material before it reaches the exit end of the tank is merged into the bath in uniformly melted state.

In this manner the maximum area of each flame from the heating fuel comes in contact with the upper surface of the material to provide the maximum heat on this surface with minimum expenditure of fuel. The batch material passing across the space between the rear bath retaining wall 40 and the outer or rear edge of the horizontal section 34 is relatively cool on its upper side, although the hot molten glass bath is underneath, and such upper side reaches approximately 200° to 300° F. before it is conducted beneath the horizontal section. However, in passing underneath the latter section, the material is heated to such extent that its upper side becomes fritted or sintered to form a continuous coherent surface of somewhat viscous consistency, but having sufficient body or strength to maintain its layer form and effectively resist buckling or distortion from forces pushing it farther into the tank.

The main body of the bath thus includes a batch melting zone or area clearly distinguished from the fritting zone or area which is included in the rear portion of the bath between the rear wall 40 and the wall 33. As shown in Figs. 1, 2 and 3, the wall 33, together with the shouldered portions 24 of the tank structure clearly define the batch melting zone or area and the fritting zone or area, and these elements provide lines of demarcation dividing the bath into the zones or areas as specified. It is apparent that the fritting zone can be designated as a batch receiving zone or area because the batch is fed upon this portion in the bath.

This blanket of material thus fritted is in proper condition to receive the fuel flames thereover without danger of agitating the batch particles or raising dust therefrom.

The atmospheric pressure in the tank, that is, inside or forwardly of the wall section 33, is substantially neutral, and since the lower side of the horizontal section 34 is in close proximity to the blanket passing underneath it, there will be no appreciable loss of heat at the charging end of the tank. In previously known types of tanks, the openings in the rear or charging end thereof were not sufficiently closed, or were frequently opened to receive the charges of batch, and flames had a tendency to blow outwardly through these openings in such manner as to carry dust into the building that houses the tank. This action which is known as "sting out" is entirely obviated by the improved method of batch feeding, and there is also obviated the dust nuisance and loss of heat which would accompany such action. The blanket of batch material between the bath retaining wall 40 and the outer edge of the horizontal section prevents loss of heat from the glass bath therebeneath. Likewise, the blanket extending uniformly a considerable distance into the tank insures maintenance of heat below it, while at the same time, presenting the maximum area for contact with the heating flames. These factors operate to reduce fuel consumption, as well as to increase efficiency of the tank.

In operating one form of mechanical construction for feeding the batch material into the tank, a hopper 50 is filled to proper level with granular glass-making material which contains proper ingredients and admixed to such consistency as to produce the type of sheet glass desired. This hopper extends substantially the entire distance across the entrance portion of the tank and the granular material or batch rests under gravity upon a horizontally swingable carrier or plate 51 that extends transversely across the entrance extremity of the tank which is substantially coextensive with the discharge opening 53 of the hopper. This plate is reciprocable from the full line to the broken line position indicated in Fig. 4.

When the plate 51 is disposed rearwardly in its broken line position with the material from the hopper resting thereon; then the forward horizontal movement of the plate to the full line position carries with it a predetermined layer 53 of the batch material. The latter material is then disposed in a position immediately overhanging the surface of the molten bath and the material in the hopper drops down upon the rear portion of the plate behind the material which has been carried forwardly. By moving the plate rearwardly, that is, by withdrawing it from its position above the bath, the layer 53 can not also be carried backwardly because the space previously occupied by this layer will have been filled by the material dropping behind it from the hopper. Hence, by withdrawing the plate 51, the batch layer 53 begins to drop upon the bath from the forward plate edge and continues to drop therefrom as the latter moves rearwardly and until the material is spread or distributed substantially uniformly along an area corresponding in width to the distance from the forward limit of reciprocation of the plate 51 to the adjacent edge of the tank wall 40.

The rear wall of the hopper is provided with a lower inclined plate shield 54 and an upper inclined plate shield 57 having pivotal supports 58 and 59, respectively, along their upper edge portions. The upper shield is disposed at a sharper incline than the lower shield and its front edge iides upon the front portion of the lower shield.

A downwardly bent flange 60 formed on the inner edge of the shield 54 is directed downwardly into frictional contact with the upper side of the carrier 51, and since the rear edge of the shield is freely pivoted, the flange is maintained in proper scraping contact with the carrier under the influence of gravity. The carrier 51 in its forward and rearward action thus moves relative to the shields 54 and 58.

The upper edge of the upper shield 56 is overlapped behind the lower rear edge of the hopper wall and its lower edge portion rests under the influence of gravity upon the shield 54 adjacent the flange 60 thereof. This arrangement compensates for movement of the carrier 51 in maintaining the flange 60 in contact therewith, and prevents the rearward displacement of the batch material during such movement. A bracket 61 welded or otherwise secured to the rear wall of the hopper carries the pivotal connections 58 and 59 for supporting the shields.

The size of the feeding opening 53 at the front side of the hopper is controlled by means of an upright gate 64 that is vertically slidable in a guide 65 carried by the front wall of the hopper, and suitable adjusting rods 67 are disposed through brackets 68 on the hopper for purposes of adjustment by manipulation of nuts 69 carried on the rods on opposite sides of the brackets.

In the succeeding forward movement of the plate 51 in its reciprocation, the next layer 52 of material, as previously described, will be moved forwardly and against the first layer 52 by the aid of a flange 63 on the plate 51, and in such manner as to push the first layer farther into the tank. This action is repeated intermittently at desired intervals, or constant reciprocation of the plate is timed in such manner as to provide for uniformly feeding the batch material at whatever rate that is desired.

In one form of reciprocating or swinging mechanism 70, opposite end portions of the batch carrier 51 are provided with pairs of links 71 having pivotal connections 73 at their upper ends securing them to the hopper 50, and at their lower ends having pivotal connections 74 securing them to the carrier 51 adjacent the front and rear edges thereof. These links 71 are equal in length and are so arranged that the carrier plate suspended thereby is maintained in horizontal position although its level changes in connection with the arcs of the swinging movement of the pivotal connections 74.

A plurality of rearwardly extending links 75 are provided with pivotal connections 76 securing their forward ends to the rear edge portion of the carrier plate 51. Each link 75 has a pivotal connection 79 securing its rear end to the upper end of an oscillatable lever 80 which has a plurality of bearing openings 81 spaced longitudinally therein. A removable bearing pin 83 pivotally supports the lever and is adapted to extend through any of the openings 81 in supporting the lever. The bearing pin 83 is supported in one of the openings 84 formed in a flange 85 of a support 87. The openings 81 and 84 are correspondingly spaced and the pin can be mounted in any two of these registering openings for the purpose of altering the lever stroke from the pivotal connection 79 to the pivotal pin 83 supporting the lever.

The lower end of the lever 80 has a pivotal connection 89 securing it to one end of a pitman 90 which has at its other end a pivotal connection 91 securing it to a crank arm 93 of a horizontally disposed shaft 94. Suitable bearings 95 in the support 87 rotatably support the shaft. Sprocket and chain gearing 97, 98 and 99 transmit power from a conventional reduction gearing unit 100 which is driven by a motor 101.

In the type of glass melting tank described herein, one or more glass sheets can be drawn, and the amount of batch fed by each stroke of the lever and batch carrier can be regulated according to the amount of glass drawn from the tank. Thus an exact balance between feeding and drawing can be maintained and the level of the glass bath maintained constant.

In operating tanks of the type described herein, it has been observed that under certain conditions one side of the tank may be more exposed to lower temperatures than the other side. For example, if the lower side of the tank shown in Fig. 1 were cooler the blanket of batch would have a tendency to drift toward this cooler side and disturb the uniformity of movement of the blanket in the tank. For purposes of counteracting this tendency, the hopper can be provided with a partition 120 to define a border line of the fed material at a location farther inwardly from the cooler side of the tank, and in order to avoid exposure of the bath surface adjacent the rear tank corners (Fig. 3) refractory members 121 provided to cover the rear corner portions of the tank can be extended farther inwardly according to the position of the blanket of batch material.

While the invention has been described particularly with regard to its applicability in the operation of glass melting apparatus, it is to be understood that it is also applicable in other respects where it may be desirable to feed a blanket of granular material upon a molten bath. For example, in the manufacture of sodium silicate, or in the copper industry where it is desirable to feed copper concentrates upon a molten copper bath.

Although practical construction and methods illustrating the invention have been shown and described in detail, it will be apparent to those skilled in the art that the invention is not so limited but that various changes can be made therein without departing from the spirit of the invention or from the scope of the appended claims.

We claim:

1. A method of incorporating granular glass making material in a molten glass bath which comprises feeding a uniform layer of the material upon the bath surface at one edge thereof, shielding a portion of the layer after the feeding thereof upon the bath, fritting the upper side of the layer while it is being shielded, and moving the fritted layer farther upon the bath until it is melted.

2. In a method of incorporating in a molten glass bath granular glass-making batch containing sufficient moisture to insure tendency of the batch particles to cohere, the steps which comprise feeding a uniform layer of the batch upon the bath surface at one edge thereof, shielding a portion of the layer after the feeding thereof on the bath, fritting the upper side of the layer while it is being shielded, and moving the layer of fritted batch farther upon the bath until it is melted.

3. In a method of incorporating in a molten glass bath granular glass-making batch containing sufficient moisture to insure tendency of the batch particles to cohere, the steps which comprise feeding a uniform layer of the batch upon the bath surface at one edge thereof, and moving the layer of batch farther upon the bath until it is melted.

4. In a method of incorporating in a molten glass bath granular glass-making batch containing moisture to the extent of approximately four to six per cent of volume thereof, the steps which comprise feeding a uniform layer of the batch upon the bath surface at one edge thereof, shielding a portion of the layer after the feeding thereof on the bath, fritting the upper side of the layer while it is being shielded, and moving the layer of fritted batch farther upon the bath until it is melted.

5. A method of incorporating granular glass batch material into a molten glass bath which comprises forming a blanket of the material upon the glass bath from its marginal portion inwardly toward the central bath portion, melting the material by playing flames upon a major portion of the surface thereof, shielding the portion of the blanket between the marginal portion of the bath and the flame area, and fritting the upper surface of the blanket of granular material while it is shielded and before it reaches the area of the flames.

6. A method of incorporating granular glass making material in a molten glass bath which comprises continuously feeding a blanket of the material upon the bath surface, playing flames over the surface of the blanket of material as it moves toward a central area of the bath to melt the material, shielding the surface of the blanket before it reaches the area of the flames, and fritting the upper surface of the blanket while it is being shielded.

7. A method of incorporating granular glass making batch in a molten bath of a melting tank having one side cooler than the opposite side which comprises feeding the batch in blanket form extending a major portion of the width of the tank and in greater spaced relation from the cooler side of the tank than from the opposite side of the tank, moving the batch progressively into the tank upon said bath, and melting the blanket of batch progressively as it moves farther into the tank.

8. A method of incorporating meltable granular batch in a molten bath which comprises feeding a uniform layer of the batch upon the bath surface at one edge thereof, shielding a portion of the layer after the feeding thereof upon the bath, fritting the upper side of the layer while it is being shielded, and moving the fritted layer farther upon the bath until it is melted.

9. In a method of incorporating granular batch in a molten glass bath having a batch-receiving zone along one marginal portion thereof and having a flame-receiving zone along the body of the bath, the steps which comprise distributing granular batch in a relatively thin layer across substantially the width of the bath at the batch-receiving zone, moving said layer on the bath toward and along the flame-receiving zone, fritting the upper side of the layer into a substantially viscous state in the batch-receiving zone before it reaches the flame-receiving zone to prevent the raising of dust in the atmosphere surrounding the bath and thus forming a coherent movable batch blanket on the bath, and melting said blanket progressively as it is moved across the bath through the flame-receiving zone.

10. In a method of incorporating granular batch in a molten glass bath having a batch-receiving zone along one marginal portion thereof and having a flame-receiving zone along the body of the bath, the steps which comprise distributing granular batch in relatively thin layers successively across substantially the width of the bath at the batch-receiving zone, moving said layers on the bath toward and along the flame-receiving zone, fritting the upper sides of the layers into a substantially viscous state in the batch-receiving zone before they reach the flame-receiving zone to prevent the raising of dust in the atmosphere surrounding the bath and thus forming a coherent movable batch blanket on the bath, and melting said blanket progressively as it is moved across the bath through the flame-receiving zone.

11. In a method of incorporating granular batch in a molten glass bath having a batch-receiving zone along one marginal portion thereof and having a flame-receiving zone along the body of the bath, the steps which comprise distributing the granular batch in relatively thin layers successively across substantially the width of the bath at the batch-receiving zone, moving said layers in side by side contact on the bath toward and along the flame-receiving zone, fritting the upper sides of the layers into a substantially viscous state in the batch-receiving zone before they reach the flame-receiving zone and thus forming a substantially coherent uniform blanket or batch movable along the bath surface, and melting said blanket progressively as it is moved across the bath through the flame-receiving zone.

12. In a method of incorporating granular glass-making batch in a molten glass bath contained in a melting tank having entrance and exit extremities, the steps which comprise distributing a relatively thin layer of batch substantially across the width of the bath at said entrance extremity, fritting into substantially viscous state the upper side of said layer in a fritting zone defined along a marginal portion of the bath adjacent said entrance extremity, and moving the fritted layer as a coherent unit beyond the fritting zone and into a melting zone along the body of the bath toward the exit extremity, and supplying sufficient heat in the melting zone to melt the layer into the bath.

13. In a method of incorporating glass-making batch in a molten glass bath, the steps which comprise progressively blanketing the bath with batch in layer form, fritting the upper surface of the blanketed batch along a fritting zone, moving the fritted batch along the bath surface into a flame-receiving zone and in an atmosphere substantially separated from the fritting zone, and progressively melting the batch as it moves along the bath in said flame-receiving zone in an atmosphere sufficiently hot to melt the batch and maintain it in melted state.

14. In a method of incorporating meltable granular batch in a molten glass bath, the steps which comprise progressively blanketing the bath with the batch in layer form, fritting the upper surface of the blanketed batch adjacent one marginal portion of the bath in a calm fritting zone extending across the bath to keep particles of granular batch from flying, moving the fritted batch into a flame-receiving zone along the body of the bath, at least partially shielding the fritting zone from the flame-receiving zone, and melting by flame said batch as it moves progressively from the fritting zone along the flame-receiving zone.

15. In a method of feeding granular glass batch to a molten glass bath along a tank furnace in which the furnace and bath extend outwardly beyond the rear furnace wall and thereby exposing to the atmosphere a batch-receiving area, the steps which comprise distributing a relatively thin layer of batch over substantially the entire surface of the bath within the area exposed to the atmosphere and moving said layer on the bath toward the interior of the furnace proper, and prior to its entrance therein fritting at least the upper portion of said layer to such extent as to seal in any dust in said layer.

16. In a method of feeding granular glass batch to a molten glass bath in a tank furnace in which the furnace and bath extend outwardly beyond the rear furnace wall and thereby exposing to the atmosphere a batch-receiving area, the steps which comprise distributing in side by side relation a series of relatively thin layers of batch over substantially the entire surface of the bath within the area exposed to the atmosphere and during the time said layers are with- in said exposed area applying to the upper surface thereof sufficient radiant heat to frit the portion of the batch layers constituting their upper surfaces, and moving said layers successively in side by side relation from the exposed area into the furnace proper to form on the surface of the molten bath within the tank proper a blanket of fritted batch.

HOWARD L. HALBACH.
WALTER G. KOUPAL.
WILLIAM OWEN.